(12) United States Patent
Min et al.

(10) Patent No.: US 8,106,595 B2
(45) Date of Patent: Jan. 31, 2012

(54) BACKLIGHT ASSEMBLY AND LIQUID CRYSTAL DISPLAY INCLUDING THE SAME

(75) Inventors: Byung-Kyou Min, Seoul (KR); Chung-Won Choi, Asan-si (KR); Jin-Won Jang, Asan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 522 days.

(21) Appl. No.: 12/409,910

(22) Filed: Mar. 24, 2009

(65) Prior Publication Data
US 2009/0243513 A1 Oct. 1, 2009

(30) Foreign Application Priority Data

Mar. 25, 2008 (KR) .................. 10-2008-0027410

(51) Int. Cl.
*G09G 37/00* (2006.01)
*H05B 37/00* (2006.01)
(52) U.S. Cl. .................... 315/169.3; 315/312
(58) Field of Classification Search ............. 315/169.1, 315/169.2, 169.3, 169.4, 274, 276, 312; 362/631, 362/633, 634, 184; 345/87, 905, 76, 80
See application file for complete search history.

(56) References Cited

U.S. PATENT DOCUMENTS
7,633,240 B2 * 12/2009 Kwon ........................ 315/282
7,837,377 B2 * 11/2010 Lee et al. ..................... 362/633
7,854,541 B2 * 12/2010 Kim ............................ 362/646
2007/0182343 A1 8/2007 Kwon FOREIGN PATENT DOCUMENTS
KR 1020060040094 5/2006
KR 1020070076257 7/2007
KR 1020070081290 8/2007

OTHER PUBLICATIONS

Chinese Office Action dated Dec. 1, 2011 in corresponding Chinese Patent Application No. 200910130127.4.

* cited by examiner

*Primary Examiner* — Douglas W Owens
*Assistant Examiner* — Minh D A
(74) *Attorney, Agent, or Firm* — F. Chau & Associates, LLC

(57) ABSTRACT

A backlight assembly including: a plurality of lamp sockets each having a socket electrode; a plurality of lamps inserted into the plurality of lamp sockets, respectively, and each of the plurality of lamps comprising a lamp electrode connected with the socket electrode of the lamp socket in which the lamp is inserted; an inverter outputting a driving voltage for driving the plurality of lamps; and a balance board having a plurality of balance capacitors, wherein the plurality of balance capacitors are inserted into the plurality of lamp sockets, respectively, and each of the balance capacitors comprises a first balance electrode provided with the driving voltage and a second balance electrode connected with the socket electrode of the lamp socket in which the balance capacitor is inserted.

25 Claims, 12 Drawing Sheets

BACKLIGHT ASSEMBLY AND LIQUID CRYSTAL DISPLAY INCLUDING THE SAME

CROSS-REFERENCE TO RELATED APPLICATION

This application claims priority to Korean Patent Application No. 10-2008-0027410 filed on Mar. 25, 2008 in the Korean Intellectual Property Office, the disclosure of which is incorporated by reference herein in its entirety.

BACKGROUND OF THE INVENTION

1. Technical Field

The present invention relates to a backlight assembly and a liquid crystal display including the same.

2. Discussion of the Related Art

Liquid crystal displays (LCDs) are among the most widely used flat panel displays. For example, LCDs are commonly found in a variety of electronic devices such as televisions, laptop computers, personal digital assistants, cell phones and digital cameras.

An LCD includes a liquid crystal panel having a first substrate having a pixel electrode, a second substrate having a common electrode, and a liquid crystal layer disposed between the first and second substrates. The LCD displays images by applying voltages to the pixel and common electrodes to generate an electric field in the liquid crystal layer that determines the orientations of LC molecules therein to change the transmittance of light passing through the liquid crystal panel. Since an LCD is not self-luminescent, it requires a backlight assembly.

A backlight assembly includes a plurality of lamps for supplying the LCD with light. A backlight assembly generally uses a balance board, which has a balance capacitor formed therein, to provide a uniform current to each of the lamps. However, this configuration increases the size of the balance board and raises manufacturing costs of a backlight assembly and a liquid crystal display including the same.

Accordingly, there exists a need for a balance board that is capable of reducing the manufacturing costs of these devices.

SUMMARY OF THE INVENTION

According to an exemplary embodiment of the present invention, there is provided a backlight assembly including a plurality of lamp sockets each having a socket electrode, a plurality of lamps inserted into the plurality of lamp sockets, respectively, and each of the lamps comprising a lamp electrode connected with the socket electrode of the lamp socket in which the lamp is inserted, an inverter outputting a driving voltage for driving the plurality of lamps, and a balance board having a plurality of balance capacitors. The plurality of balance capacitors are inserted into the plurality of lamp sockets, respectively, and each of the balance capacitors comprises a first balance electrode provided with the driving voltage and a second balance electrode connected with the socket electrode of the lamp socket in which the balance capacitor is inserted.

The balance board is provided with the driving voltage to supply a uniform driving current to each of the plurality of lamps and the driving current is provided to the lamp electrode of each of the lamps through each of the plurality of balance capacitors, respectively.

The balance board comprises: a body; and an insulating substrate extending from the body and comprising a plurality of protrusions inserted into the plurality of lamp sockets, respectively, wherein at least one of the first balance electrodes is formed on a first surface of each of the plurality of protrusions and at least one of the second balance electrodes is formed on a second surface of each of the plurality of protrusions, the second surface facing the first surface.

The first balance electrodes are interconnected.

The second balance electrodes are separated and insulated from each other.

The balance board further comprises an insulating film which covers the first balance electrodes.

The balance board comprises: an insulating substrate; and a plurality of dielectrics formed to protrude from a side of the insulating substrate, wherein at least one of the first balance electrodes is formed on a first surface of each of the plurality of dielectrics and at least one of the second balance electrodes is formed on a second surface of each of the plurality of dielectrics, the second surface facing the first surface.

The balance board comprises: a body; and an insulating substrate extending from the body and comprising a plurality of protrusions inserted into the plurality of lamp sockets, respectively, wherein at least one of the first balance electrodes is formed inside each of the plurality of protrusions and at least one of the second balance electrodes is formed outside each of the plurality of protrusions.

Each of the plurality of balance capacitors is a cylindrical capacitor.

The balance board comprises: a body; and a plurality of protrusions extending from the body, which are inserted into the plurality of lamp sockets, respectively, wherein at least one of the first balance electrodes is formed at an edge of each of the plurality of protrusions that is inserted into the plurality of lamp sockets and at least one of the second balance electrodes is mounted inside each of the plurality of protrusions and faces the electrode formed at an edge thereof.

Each of the plurality of lamp sockets further comprises a support member to support the balance board.

The support member faces the socket electrode inside the lamp socket such that when a balance capacitor is inserted between the socket electrode and the support member, the support member applies pressure to the balance capacitor towards the socket electrode.

According to an exemplary embodiment of the present invention, there is provided a liquid crystal display including a liquid crystal panel, and a backlight assembly. The backlight assembly includes a plurality of lamp sockets each having a socket electrode, a plurality of lamps inserted into the plurality of lamp sockets, respectively, and each of the lamps comprising a lamp electrode connected with the socket electrode of the lamp socket in which the lamp is inserted, an inverter outputting a driving voltage for driving the plurality of lamps, and a balance board having a plurality of balance capacitors. The plurality of balance capacitors are inserted into the plurality of lamp sockets, respectively, and each of the balance capacitors comprises a first balance electrode provided with the driving voltage and a second balance electrode connected with the socket electrode of the lamp socket in which the balance capacitor is inserted.

The balance board is provided with the driving voltage to supply a uniform driving current to each of the plurality of lamps and the driving current is provided to the lamp electrode of each of the lamps through each of the plurality of balance capacitors.

The balance board comprises: a body; and an insulating substrate extending from the body and comprising a plurality of protrusions inserted into the plurality of lamp sockets, respectively, wherein at least one of the first balance electrodes is formed on a first surface of each of the plurality of protrusions and at least one of the second balance electrodes is formed on a second surface of each of the plurality of protrusions, the second surface facing the first surface.

The first balance electrodes are interconnected.

The second balance electrodes are separated and insulated from each other.

The balance board further comprises an insulating film which covers the first balance electrodes.

The balance board comprises: an insulating substrate; and a plurality of dielectrics formed to protrude from a side of the insulating substrate, wherein at least one of the first balance electrodes is formed on a first surface of each of the plurality of dielectrics and at least one of the second balance electrodes is formed on a second surface of each of the plurality of dielectrics, the second surface facing the first surface.

The balance board comprises: a body; and an insulating substrate extending from the body and comprising a plurality of protrusions, inserted into the plurality of lamp sockets, respectively, wherein at least one of the first balance electrodes is formed inside each of the plurality of protrusions and at least one of the second balance electrodes is formed outside each of the plurality of protrusions.

Each of the plurality of balance capacitors is a cylindrical capacitor.

The balance board comprises: a body; and a plurality of protrusions extending from the body, which are inserted into the plurality of lamp sockets, respectively, wherein at least one of the first balance electrodes is formed at an edge of each of the plurality of protrusions that is inserted into the plurality of lamp sockets and at least one of the second balance electrodes is mounted inside each of the plurality of protrusions and faces the electrode formed at an edge thereof.

Each of the plurality of lamp sockets further comprises a support member to support the balance board.

The support member faces the socket electrode inside the lamp socket such that when the balance capacitor is inserted between the socket electrode and the support member, the support member applies pressure to the balance capacitor towards the socket electrode.

According to an exemplary embodiment of the present invention, a balance board for a backlight assembly comprises: a body; and a plurality of protrusions extending from the body, wherein a first balance electrode is formed on a first surface of each of the plurality of protrusions and a second balance electrode is formed on a second surface of each of the plurality of protrusions, the first and second surfaces facing each other, and wherein each protrusion having the first and second balance electrodes formed thereon constitutes a balance capacitor.

BRIEF DESCRIPTION OF THE DRAWINGS

The above and other features of the present invention will become more apparent by describing in detail exemplary embodiments thereof with reference to the attached drawings in which.

DESCRIPTION OF EXEMPLARY EMBODIMENTS

Figure 1:
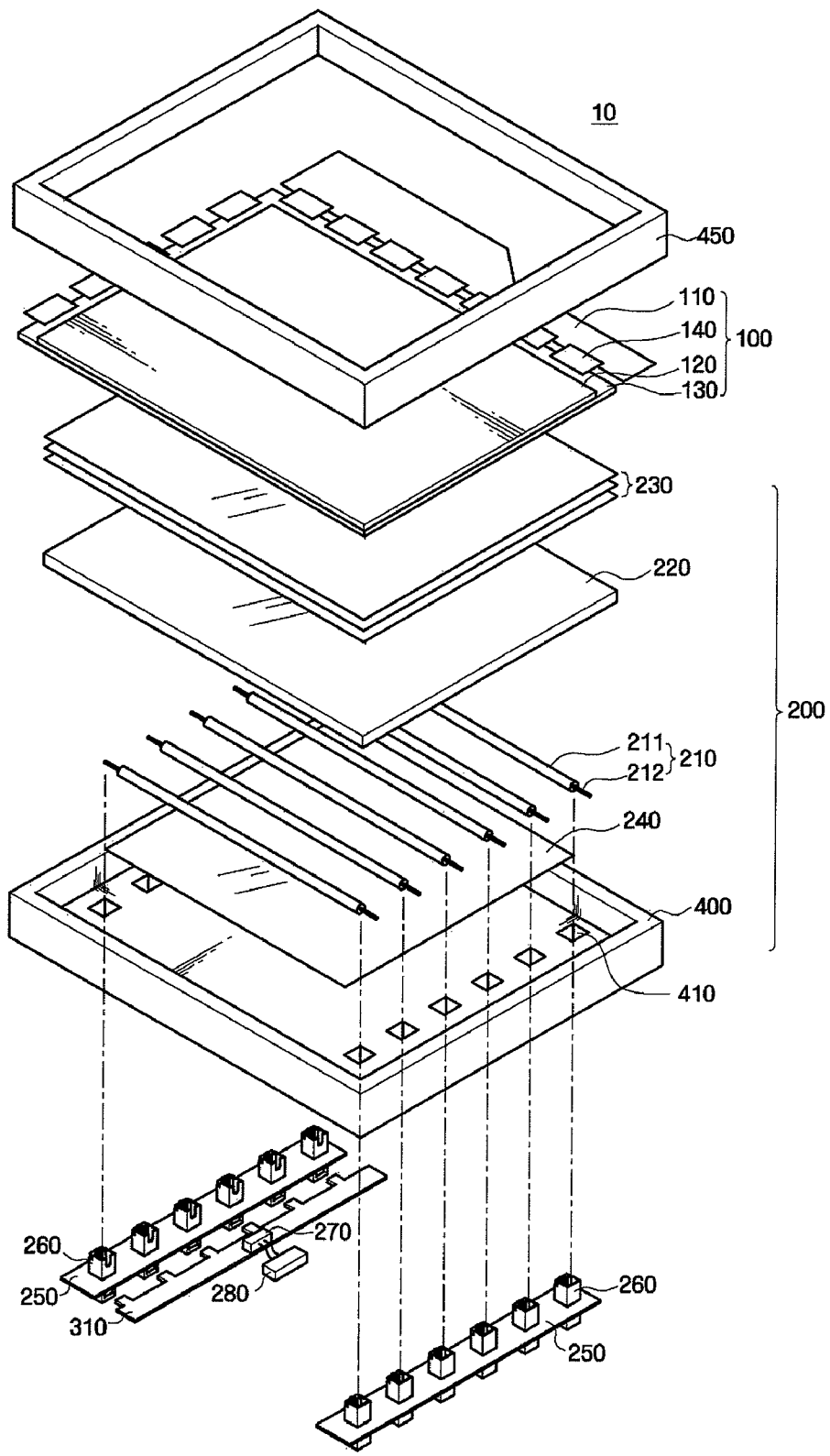
FIG. 1 is an exploded perspective view of a backlight assembly and a liquid crystal display including the same according to an exemplary embodiment of the present invention.

Exemplary embodiments of the present invention will be described more fully hereinafter with reference to the accompanying drawings. The present invention may, however, be embodied in many different forms and should not be construed as being limited to the embodiments set forth herein. In the drawings, thicknesses of layers and regions may be exaggerated for clarity.

That a first part such as a layer, an area, a substrate, etc. is provided "over" or "on" a second part may mean that the first part is provided directly on the second part, or that a third part is provided therebetween.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms may encompass different orientations of the device in use or operation in addition to the orientation depicted in the figures. Like reference numbers refer to like elements throughout.

Figure 2A:
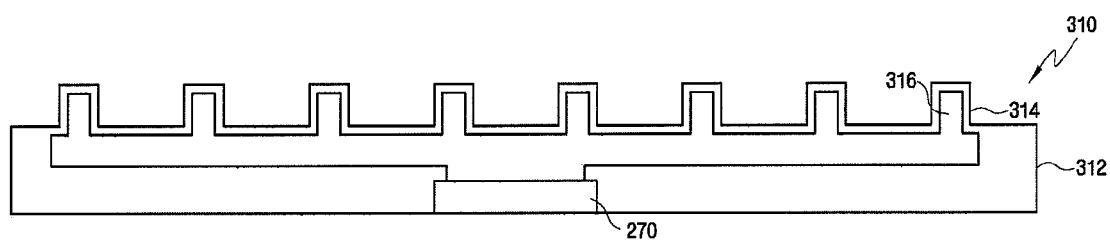
FIGS. 2A through 2C are top, bottom and side views, respectively, of a balance board illustrated in FIG. 1 according to an exemplary embodiment of the present invention.
Figure 2B:
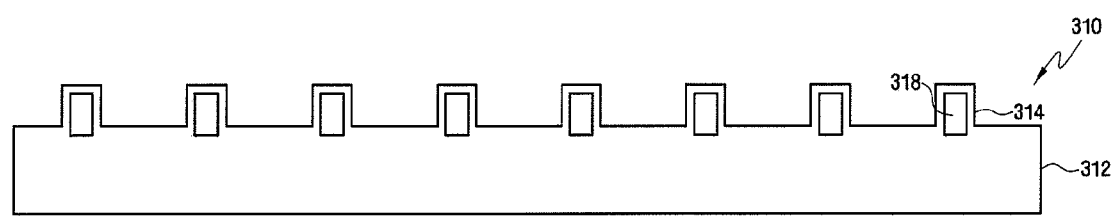
Figure 2C:
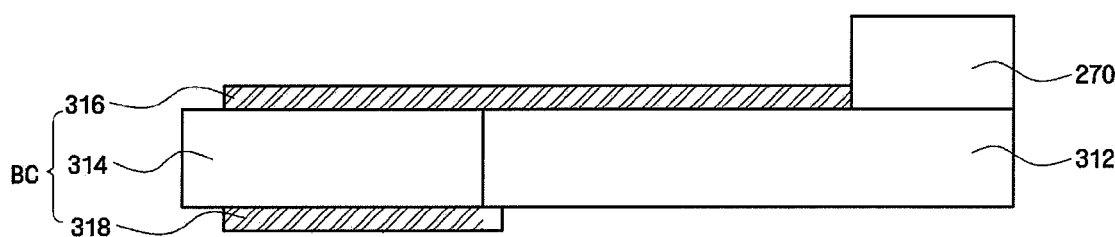
Figure 3:
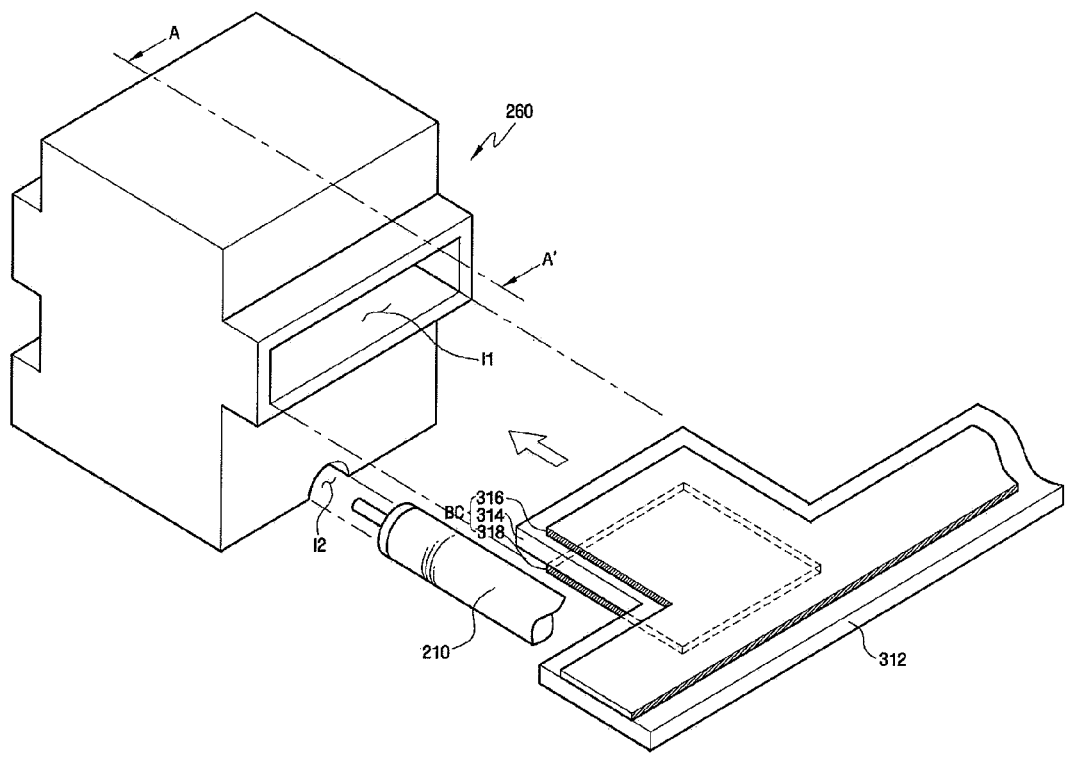
FIG. 3 is a perspective view of a lamp socket, a lamp and a balance board according to an exemplary embodiment of the present invention, prior to connecting the lamp and the balance board to the lamp socket.
Figure 4:
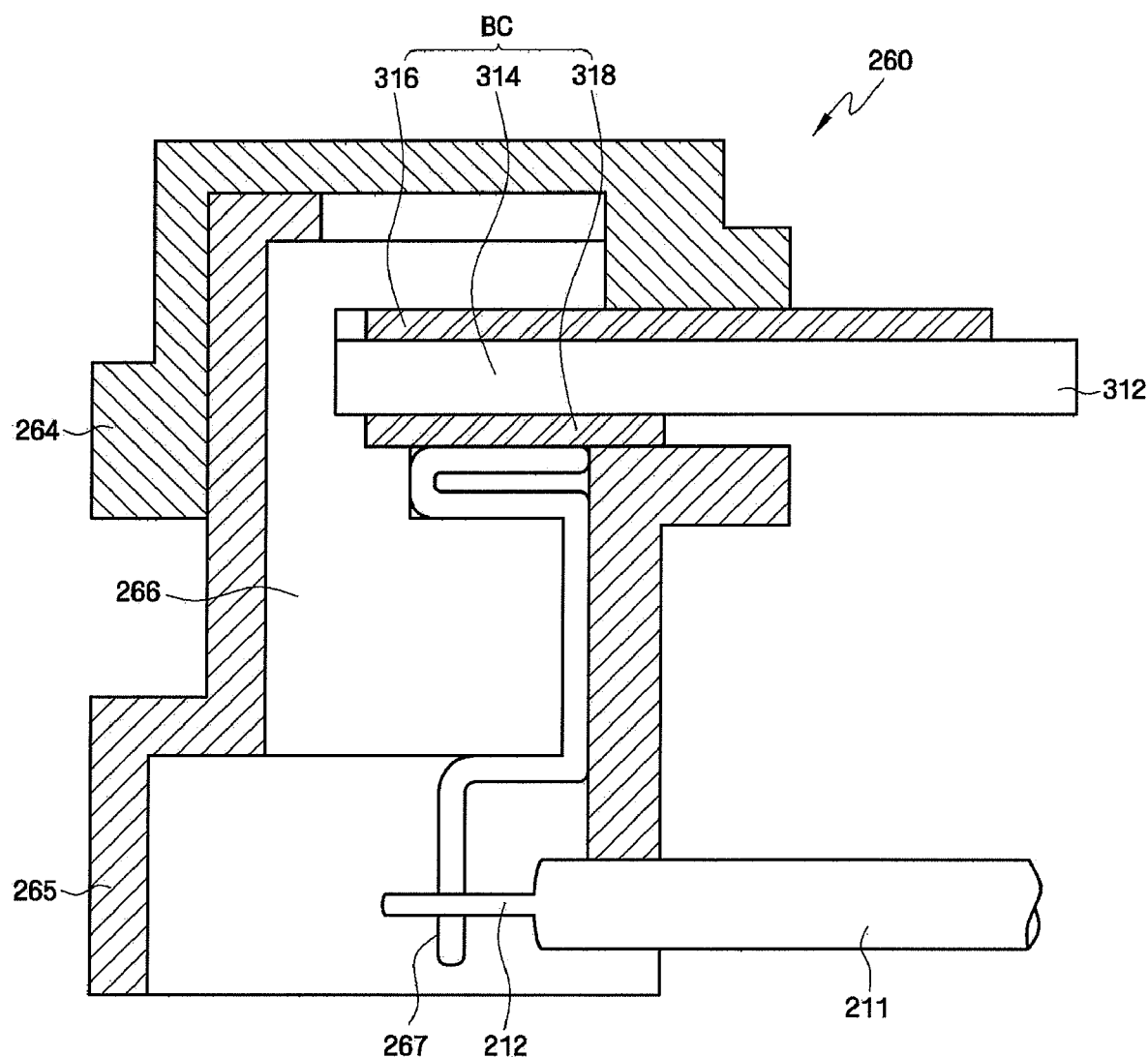
FIG. 4 is a cross-sectional view of the lamp socket, which includes the lamp and the balance board connected thereto, taken along line A-A' of FIG. 3.
Figure 5:
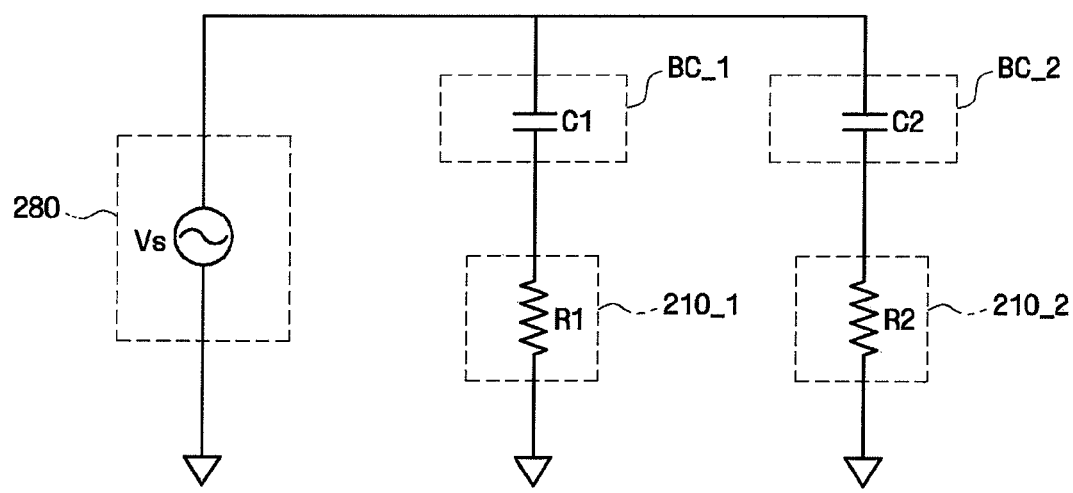
FIG. 5 is a circuit diagram for explaining a function of a balance capacitor according to an exemplary embodiment of the present invention.

Hereinafter, a backlight assembly 200 and a liquid crystal display 10 including the same according to an exemplary embodiment of the present invention will be described with reference to FIGS. 1 through 5. FIG. 1 is an exploded perspective view of a backlight assembly and a liquid crystal display including the same according to an exemplary embodiment of the present invention, FIGS. 2A through 2C are top, bottom and side views, respectively, of a balance board illustrated in FIG. 1 according to an exemplary embodiment of the present invention, FIG. 3 is a perspective view of a lamp socket, a lamp and a balance board according to an exemplary embodiment of the present invention, prior to connecting the lamp and the balance board to the lamp socket, FIG. 4 is a cross-sectional view of the lamp socket, which includes the lamp and the balance board connected thereto, taken along line A-A' of FIG. 3, and FIG. 5 is a circuit diagram for explaining a function of a balance capacitor according to an exemplary embodiment of the present invention.

Referring to FIG. 1, the liquid crystal display 10 includes a liquid crystal panel assembly 100, the backlight assembly 200, a top chassis 450, and a bottom chassis 400.

The liquid crystal panel assembly 100 includes liquid crystal panels 120 and 130, a printed circuit board 110, and a driver integrated circuit (IC) 140.

The printed circuit board 110 has various circuit components (not shown) mounted thereon, the various circuit components supply data signals and gate signals to the driver IC 140.

The liquid crystal panels 120 and 130 are controlled by the driver IC 140 and display images.

The backlight assembly 200 is disposed below the liquid crystal panels 120 and 130 and supplies the liquid crystal panels 120 and 130 with light. The backlight assembly 200 includes a plurality of lamps 210, a plurality of lamp sockets 260 and 260', an inverter 280, a balance board 310, a diffusion sheet 220, optical sheets 230, and a reflecting sheet 240.

Examples of the lamps 210 may include a light-emitting diode ("LED"), a cold cathode fluorescent lamp ("CCFL"), and an external electrode fluorescent lamp ("EEFL") element. The respective lamps 210 receive a uniform driving current from the inverter 280 and generate light. According to the present exemplary embodiment, the lamps 210 are spaced apart from each other by a predetermined distance and positioned in parallel to each other in the same plane. The lamps 210 may be configured for a direct lighting type LCD. To achieve uniformity in brightness, the lamps 210 may be arranged in parallel with a long side of the bottom chassis 400. In the following description, the lamps 210 according to the present exemplary embodiment are explained with regard to CCFLs. However, the present exemplary embodiment is not limited thereto.

The diffusion sheet 220 is disposed on the lamps 210 and improves the brightness of the light incident from the lamps 210 and the uniformity of brightness.

The optical sheets 230 are disposed on the diffusion sheet 220 and serve to diffuse and focus light coming from the lamps 210. The optical sheets 230 include a diffusion sheet, a first prism sheet, a second prism sheet, and various other sheets with similar properties. The prism sheet is disposed on the diffusion sheet and may include trigonal prism patterns (not shown) uniformly arranged on a surface of the first prism sheet to focus light diffused from the diffusion sheet and to output the focused light. The second prism sheet is disposed on the first prism sheet, and is a multi-layered, reflective, polarization prism sheet for focusing, polarizing, and outputting light. In an exemplary embodiment of the present invention where the first prism sheet provides sufficient brightness and viewing angle, the second prism sheet may be omitted.

The reflecting sheet 240 is disposed under the lamps 210 and reflects light generated by the lamps 210 toward the liquid crystal panel assembly 100. To minimize loss of light emitted from the lamps 210, the reflecting sheet 240 is made of a highly reflective material.

The plurality of lamp sockets 260 and 260' are fixed to and aligned on fixing plates 250 and 250' to then be fixed to socket holes 410 of the bottom chassis 400. Here, the plurality of lamp sockets 260 and 260' and the fixing plates 250 and 250' may be integrally formed with each other. The fixing plates 250 and 250' may be omitted.

The balance board 310 is connected with the inverter 280 through a connector 270 to be provided with a driving voltage from the inverter 280, and supplies the uniform driving current to each of the lamps 210. As illustrated in FIG. 1, the balance board 310 may be connected with some lamp sockets 260 and the other lamp sockets 260' may be connected with a ground terminal of the inverter 280.

The balance board 310 will now be described in more detail with reference to FIGS. 2A through 2C. FIG. 2A is a top view of the balance board 310, FIG. 2B is a bottom view of the balance board 310, and FIG. 2C is a side view of the balance board 310.

The balance board 310 includes a body 312, an insulating substrate having a plurality of protrusions 314 which extend from the body 312 and are inserted into the lamp sockets 260, a plurality of first balance electrodes 316 formed on first surfaces of the protrusions 314, and a plurality of second balance electrodes 318 formed on second surfaces of the protrusions 314 while facing the first surfaces. Each of the first balance electrodes 316, each of the protrusions 314, and each of the second balance electrodes 318 constitute a balance capacitor BC. In other words, each of the protrusions 314 between the first balance electrode 316 and the second balance electrode 318, functions as a dielectric. The protrusions 314 may form an insulating substrate integrated as one piece with the body 312.

The plurality of first balance electrodes 316 are interconnected and are provided with a driving voltage supplied from the inverter 280 through the connector 270. The plurality of second balance electrodes 318 are separated and insulated from each other.

The balance board 310 and each of the lamps 210 are inserted into a first insertion hole I1 and a second insertion hole I2 of each of the lamp sockets 260 as illustrated in FIG. 3. More specifically, each of the protrusions 314 of the insulating substrate is inserted into the first insertion hole I1. In other words, each balance capacitor BC is inserted into each of the lamp sockets 260.

Hereinafter, a connection relationship between each of the lamp sockets 260 and the balance board 310 will be described in detail with reference to FIGS. 3 and 4. For convenience of explanation, only one of the lamp sockets 260, one lamp 210 and the balance board 310 illustrated in FIG. 1 are illustrated in FIGS. 3 and 4.

The lamp socket 260 may include a first housing 264, a second housing 265, a third housing 266, and a socket electrode 267. The first insertion hole I1 may be formed in the first housing 264, the second insertion hole I2 may be formed in the second housing 265, and the third housing 266 may support the socket electrode 267. The first housing 264 and the second housing 266 may have a step therebetween to support the balance board 310, the bottom chassis 400, and the reflecting sheet 240. One end of the socket electrode 267 is connected with a lamp electrode 212 and the other end of the socket electrode 267 is connected with the second balance electrode 318 of a balance capacitor BC. Here, the socket electrode 267 is not connected with the first balance electrode 316 of the balance capacitor BC. The balance board 310, when provided with a driving voltage from the inverter 280, supplies a driving current to the lamp 210. The driving current is provided to the lamp 210 through the balance capacitor BC and the socket electrode 267.

A description will now be made of a function of a balance capacitor BC according to an exemplary embodiment of the present invention with reference to FIG. 5.

Referring to FIG. 5, the inverter 280, balance capacitors BC_1 and BC_2, and lamps 210_1 and 210_2 are illustrated as an equivalent circuit diagram. The inverter 280 may be regarded as a power source for outputting an alternating-current (AC) driving voltage Vs in an equivalent manner. The balance capacitors BC_1 and BC_2 may be regarded as capacitors C_1 and C_2. The lamps 210_1 and 210_2 may be regarded as resistors R1 and R2. Since the driving voltage Vs is of an AC type, the balance capacitors BC_1 and BC_2 and the lamps 210_1 and 210_2 act as impedances. Here, when the impedance values of the balance capacitors BC_1 and BC_2 are large, a current flowing through the plurality of lamps 210_1 and 210_2 becomes uniform in spite of different resistances of the resistors R1 and R2 for the lamps 210_1 and 210_2.

Since such a balance capacitor BC is inserted into the lamp socket 260 as described above, the size of the balance board 310 can be reduced. In other words, by forming the balance capacitor BC in the protrusion 314, the size of the body 312 can be reduced. The manufacturing cost of the liquid crystal display 10 can also be reduced by reducing the size of the balance board 310.

The bottom chassis 400 illustrated in FIG. 1 receives the lamp 210, the diffusion sheet 220, the optical sheets 230, and the reflecting sheet 240. The top chassis 450 illustrated in FIG. 1 descends from above the liquid crystal panels 120 and 130 to be engaged with the bottom chassis 400.

Figure 6A:
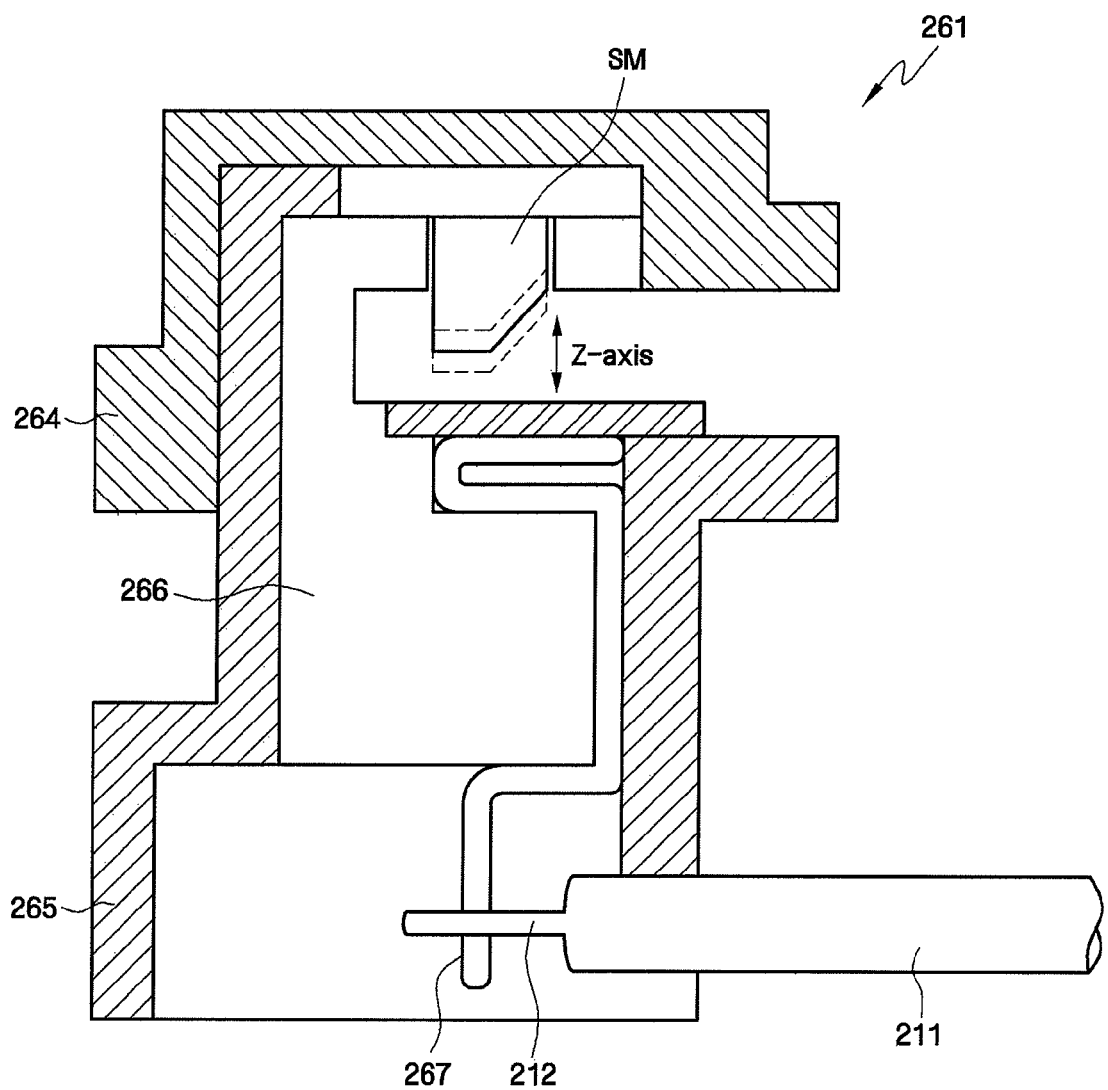
FIGS. 6A and 6B are cross-sectional views of a lamp socket with a lamp connected thereto, and the lamp socket with the lamp and a balance board connected thereto, respectively, according to an exemplary embodiment of the present invention.
Figure 6B:
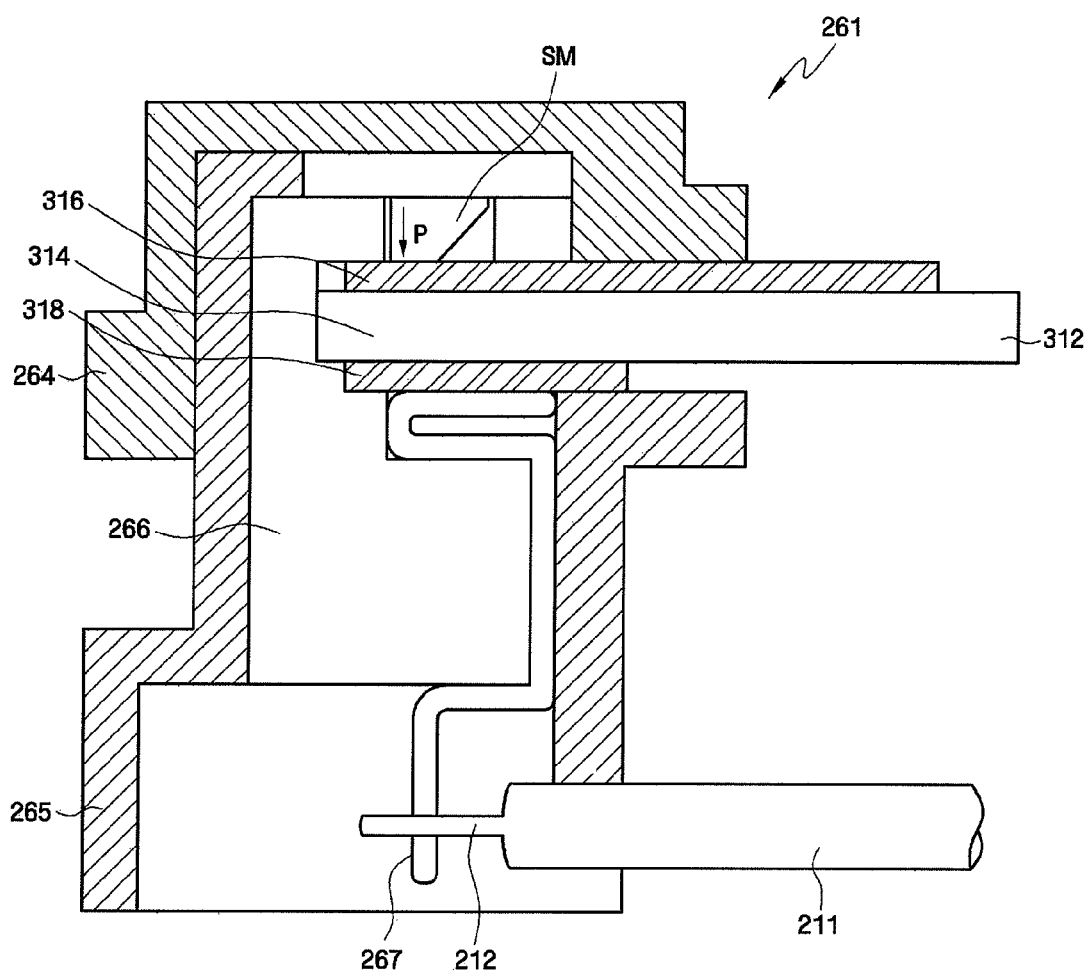

Next, a description will now be made of a backlight assembly and a liquid crystal display including the same according to an exemplary embodiment of the present invention with reference to FIGS. 6A and 6B. FIGS. 6A and 6B are cross-sectional views of a lamp socket with a lamp connected thereto, and the lamp socket with the lamp and a balance board connected thereto, respectively, according to an exemplary embodiment of the present invention. For convenience of illustration, the same functional elements as those in the exemplary embodiment of the present invention shown in FIG. 4 are represented by the same reference numerals, and a detailed description thereof will be omitted.

Referring to FIG. 6A, a lamp socket 261 includes a support member SM therein. For example, the support member SM is included to face the socket electrode 267, and may have elasticity in the direction of the socket electrode 267. In other words, the support member SM may move along a Z axis as illustrated in FIG. 6A.

Referring to FIG. 6B, once the balance board 310 is inserted into the lamp socket 261, the support member SM contracts upwardly along the Z axis and may apply pressure downwardly along the Z axis by means of elasticity. In this way, the balance board 310 can be prevented from being separated from the lamp socket 261 and a contact failure between the socket electrode 267 and the second balance electrode 318 can be prevented. However, the support member SM is not limited to the shape illustrated in FIGS. 6A and 6B. Moreover, the support member SM may support the balance board 310 by using other physical forces than elasticity or by using a mechanical engagement means. The support member SM may also be made of an insulating material.

Figure 7:
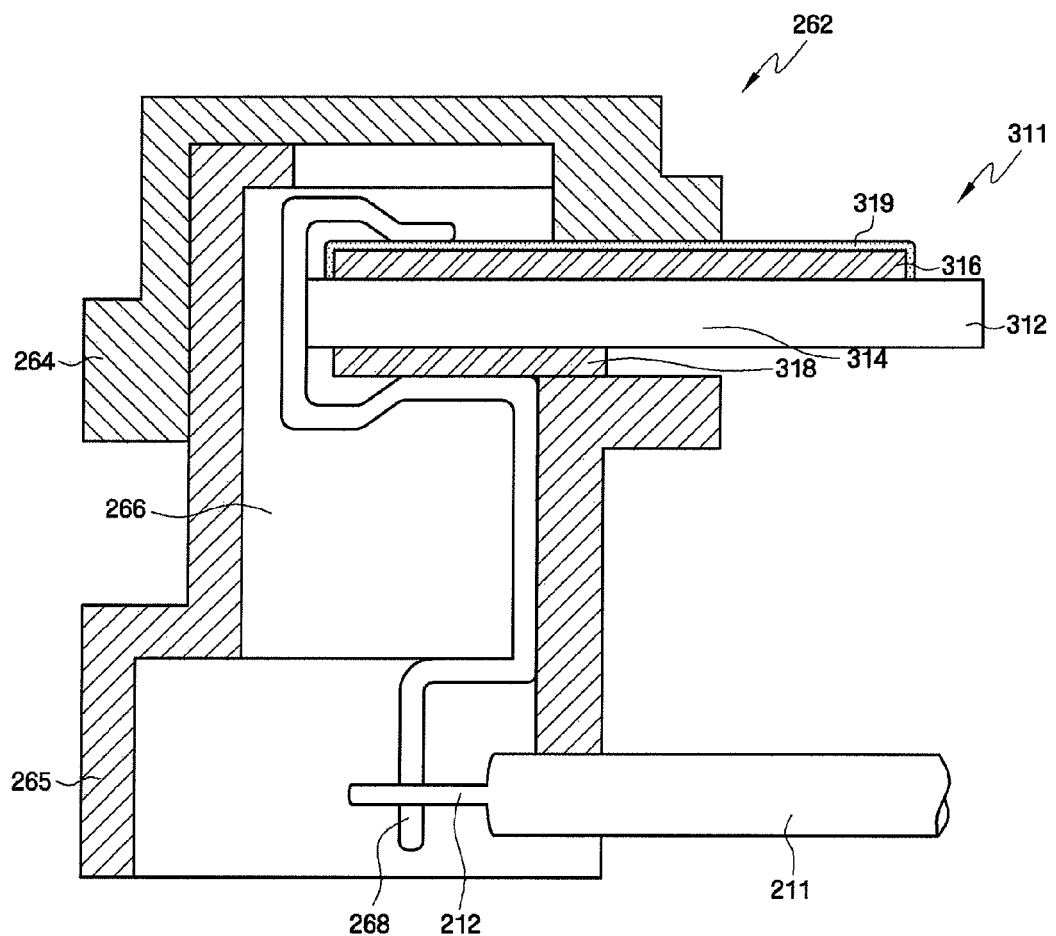
FIG. 7 is a cross-sectional view of a lamp socket having a lamp and a balance board connected thereto according to an exemplary embodiment of the present invention.

Next, a backlight assembly and a liquid crystal display including the same according to an exemplary embodiment of the present invention will be described with reference to FIG. 7. FIG. 7 is a cross-sectional view of a lamp socket having a lamp and a balance board connected thereto according to an exemplary embodiment of the present invention.

Referring to FIG. 7, a balance board 311 further includes an insulating film 319 which covers the first balance electrode 316. Thus, even when a socket electrode 268 of a lamp socket 262 is shaped as illustrated in FIG. 7, the first balance electrode 316 and the second balance electrode 318 are not shorted. At this time, the socket electrode 268 may support and fix the balance board 311 by means of elasticity.

Figure 8A:
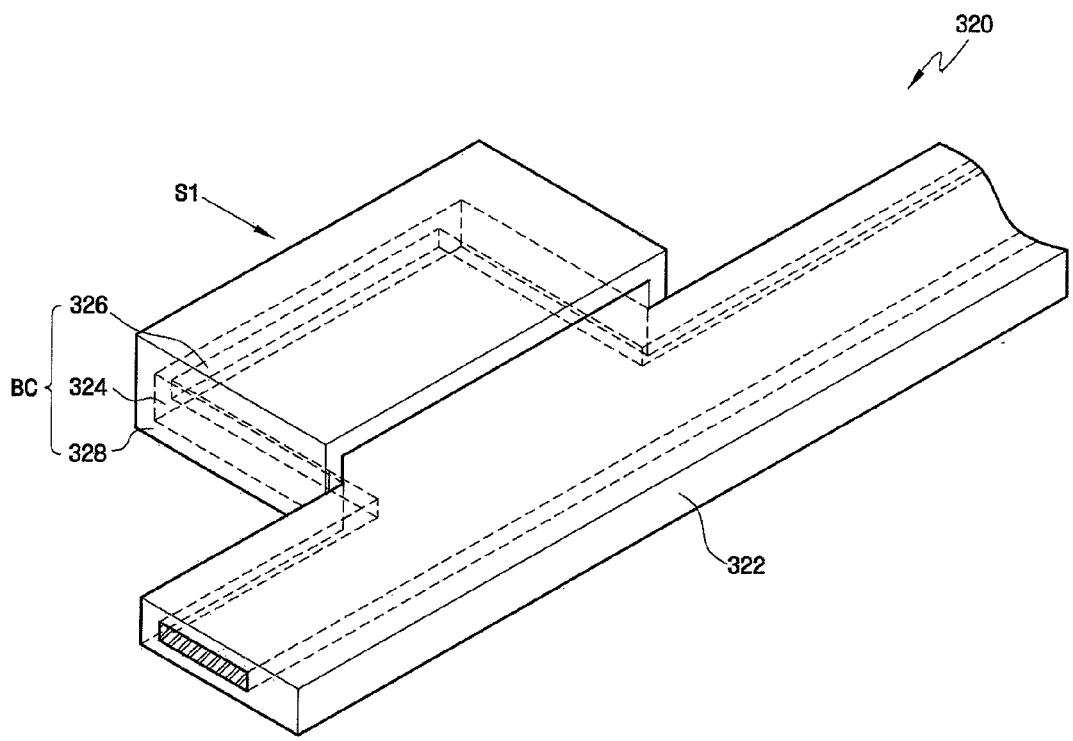
FIG. 8A is a perspective view of a balance board with a protrusion thereof inside an insertion hole of a lamp socket according to an exemplary embodiment of the present invention.
Figure 8B:
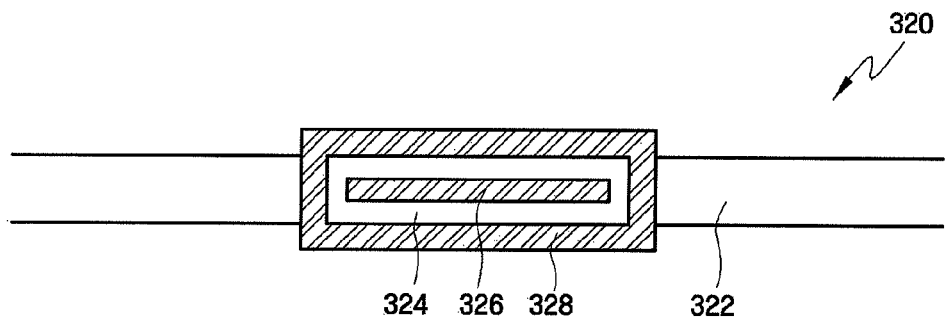
FIG. 8B is a cross-sectional view of the balance board illustrated in FIG. 8A viewed from S1 of FIG. 8A.

A backlight assembly and a liquid crystal display including the same according to an exemplary embodiment of the present invention will be described with reference to FIGS. 8A and 8B. FIG. 8A is a perspective view of a balance board with a protrusion thereof inside an insertion hole of a lamp socket according to an exemplary embodiment of the present invention, and FIG. 8B is a cross-sectional view of the balance board illustrated in FIG. 8A viewed from S1 of FIG. 8A. For convenience of illustration, the same functional elements as those in the exemplary embodiments of the present invention shown in FIGS. 4, 6A and 6B are represented by the same reference numerals, and a detailed description thereof will be omitted.

Referring to FIGS. 8A and 8B, a first balance electrode 326 is mounted inside a body 322 and a protrusion 324 and a second balance electrode 328 is formed outside the protrusion 324. Thus, a balance capacitor BC may have a cylindrical shape. Since this balance capacitor BC is inserted into the lamp socket 260, the size of a balance board 320 is reduced, thereby reducing the manufacturing cost of the liquid crystal display.

Figure 9A:
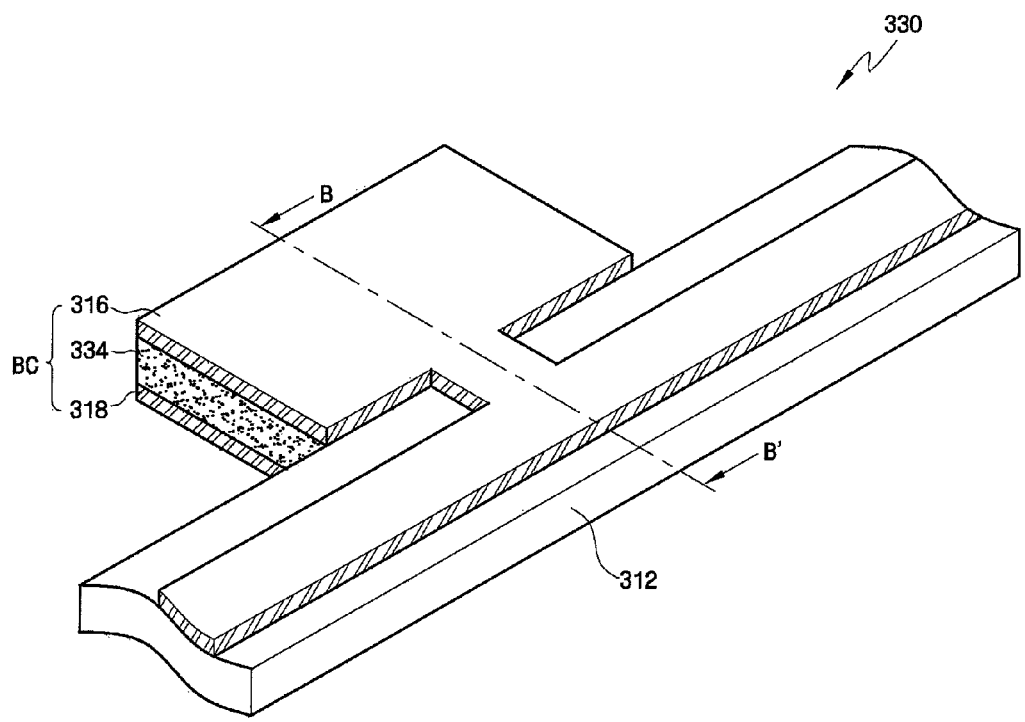
FIG. 9A is a perspective view of a balance board according to an exemplary embodiment of the present invention.

Next, a backlight assembly and a liquid crystal display including the same according to an exemplary embodiment of the present invention will be described with reference to FIGS. 9A and 9B. FIG. 9A is a perspective view of a balance board according to an exemplary embodiment of the present invention, and FIG. 9B is a cross-sectional view taken along line B-B' of FIG. 9A.

Figure 9B:
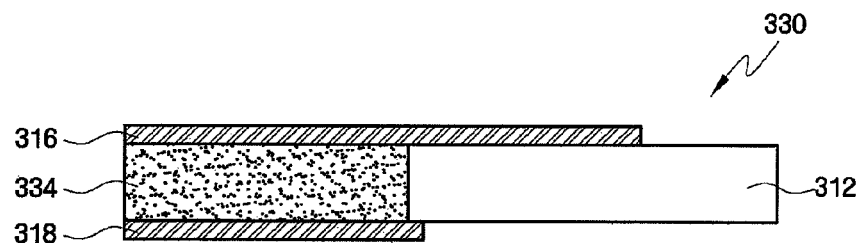
FIG. 9B is a cross-sectional view taken along line B-B' of FIG. 9A.

Referring to FIGS. 9A and 9B, a balance board 330 includes a body 312, which is an insulating substrate, and a dielectric 334 formed to protrude from a side of the body 312, the first balance electrode 316 is formed on a first surface of the dielectric 334 and the second balance electrode 318 is formed on a second surface of the dielectric 334. Here, the dielectric 334 may have a dielectric constant desired by a manufacturer. In other words, the manufacturer may form a balance capacitor BC having a capacitance required for a resistance of the lamp 210.

Figure 10A:
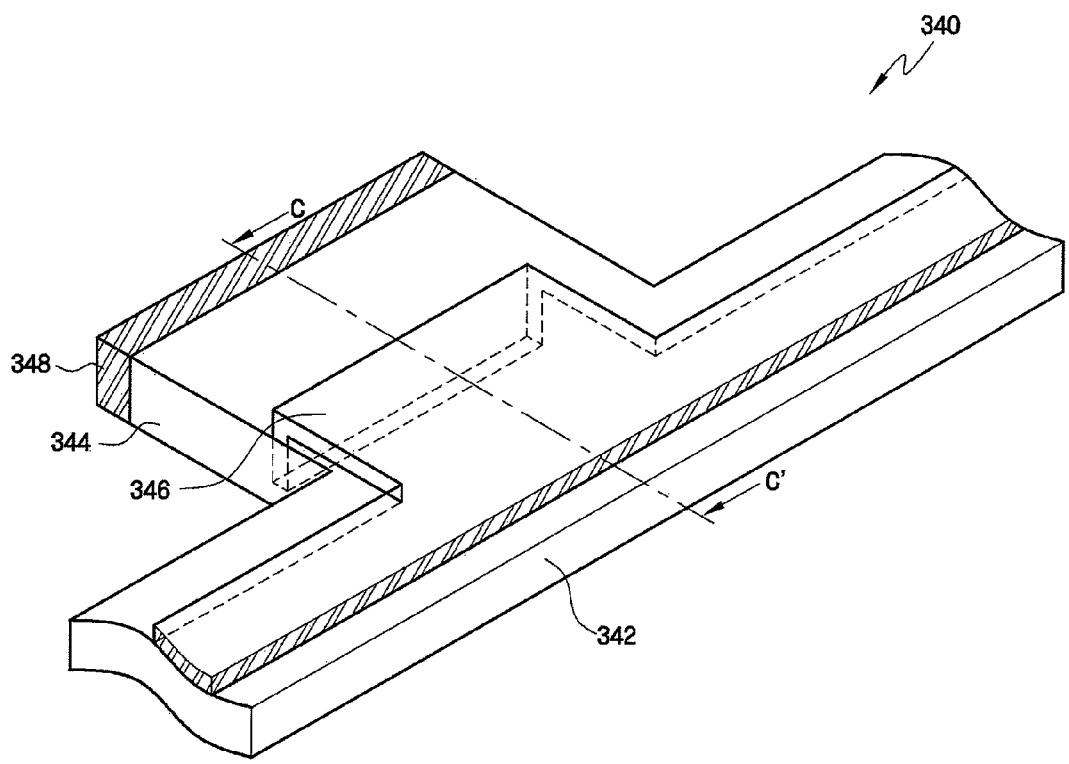
FIG. 10A is a perspective view of a balance board according to an exemplary embodiment of the present invention.

Hereinafter, a description will be made of a backlight assembly and a liquid crystal display including the same according to an exemplary embodiment of the present invention with reference to FIGS. 10A through 11. FIG. 10A is a perspective view of a balance board according to an exemplary embodiment of the present invention, FIG. 10B is a cross-sectional view taken along line C-C' of FIG. 10A, and FIG. 11 is a cross-sectional view of a lamp socket having a lamp and the balance board illustrated in FIGS. 10A and 10B connected thereto according to an exemplary embodiment of the present invention.

Figure 10B:
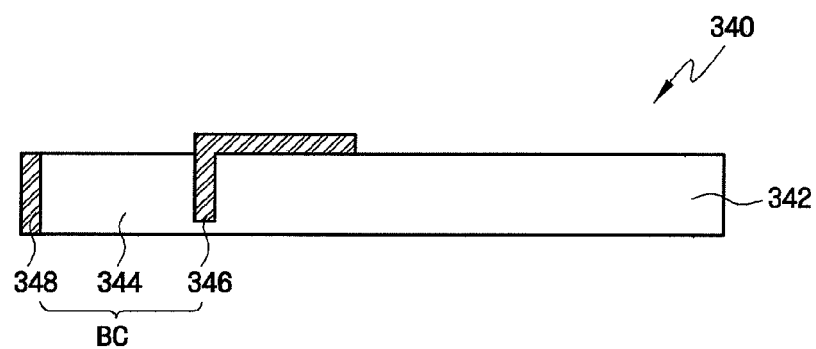
FIG. 10B is a cross-sectional view taken along line C-C' of FIG. 10A.

Referring to FIGS. 10A and 10B, a second balance electrode 348 of a balance board 340 is formed on a side of a protrusion 344, and a first balance electrode 346, extending from a body 342, is bent to face the second balance electrode 348 and is mounted inside the protrusion 344. Thus, the second balance electrode 348 formed on the side of the protrusion 344 and the first balance electrode 346 mounted inside the protrusion 344 form a balance capacitor BC.

Figure 11:
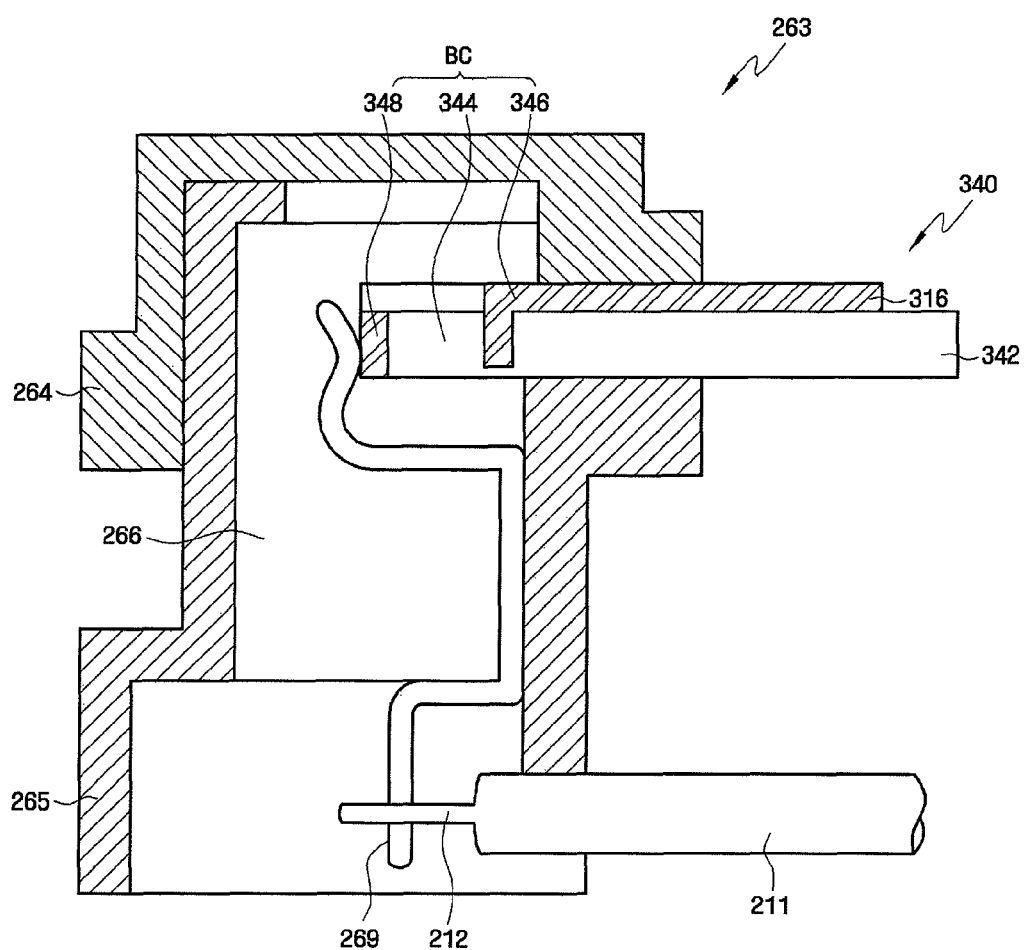
FIG. 11 is a cross-sectional view of a lamp socket having a lamp and the balance board illustrated in FIGS. 10A and 10B connected thereto according to an exemplary embodiment of the present invention.

Referring to FIG. 11, a socket electrode 269 is formed to be connected with the second balance electrode 348 formed on the side of the protrusion 344. In this way, since the balance capacitor BC is inserted into a lamp socket 263, the size of the balance board 340 is reduced, thereby reducing the manufacturing cost of the liquid crystal display.

Various configurations of a balance board in accordance with exemplary embodiments of the present invention have been described above. The resulting balance boards have small sizes, thereby enabling the manufacturing costs of a backlight assembly and a liquid crystal display having the same to be reduced. Further, the balance boards are capable of providing a uniform driving current to a plurality of backlight lamps.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A backlight assembly comprising:
    a plurality of lamp sockets each having a socket electrode;
    a plurality of lamps inserted into the plurality of lamp sockets, respectively, and each of the lamps comprising a lamp electrode connected with the socket electrode of the lamp socket in which the lamp is inserted;
    an inverter outputting a driving voltage for driving the plurality of lamps; and
    a balance board having a plurality of balance capacitors,
    wherein the plurality of balance capacitors are inserted into the plurality of lamp sockets, respectively, and each of the balance capacitors comprises a first balance electrode provided with the driving voltage and a second balance electrode connected with the socket electrode of the lamp socket in which the balance capacitor is inserted.

2. The backlight assembly of claim 1, wherein the balance board is provided with the driving voltage to supply a uniform driving current to each of the plurality of lamps and the driving current is provided to the lamp electrode of each of the lamps through each of the plurality of balance capacitors, respectively.

3. The backlight assembly of claim 1, wherein the balance board comprises:
    a body; and
    an insulating substrate extending from the body and comprising a plurality of protrusions inserted into the plurality of lamp sockets, respectively,
    wherein at least one of the first balance electrodes is formed on a first surface of each of the plurality of protrusions and at least one of the second balance electrodes is formed on a second surface of each of the plurality of protrusions, the second surface facing the first surface.

4. The backlight assembly of claim 3, wherein the first balance electrodes are interconnected.

5. The backlight assembly of claim 3, wherein the second balance electrodes are separated and insulated from each other.

6. The backlight assembly of claim 3, wherein the balance board further comprises an insulating film which covers the first balance electrodes.

7. The backlight assembly of claim 1, wherein the balance board comprises:
    an insulating substrate; and
    a plurality of dielectrics formed to protrude from a side of the insulating substrate,
    wherein at least one of the first balance electrodes is formed on a first surface of each of the plurality of dielectrics and at least one of the second balance electrodes is formed on a second surface of each of the plurality of dielectrics, the second surface facing the first surface.

8. The backlight assembly of claim 1, wherein the balance board comprises:
    a body; and
    an insulating substrate extending from the body and comprising a plurality of protrusions inserted into the plurality of lamp sockets, respectively,
    wherein at least one of the first balance electrodes is formed inside each of the plurality of protrusions and at least one of the second balance electrodes is formed outside each of the plurality of protrusions.

9. The backlight assembly of claim 8, wherein each of the plurality of balance capacitors is a cylindrical capacitor.

10. The backlight assembly of claim 1, wherein the balance board comprises:
    a body; and
    a plurality of protrusions extending from the body, which are inserted into the plurality of lamp sockets, respectively,
    wherein at least one of the first balance electrodes is formed at an edge of each of the plurality of protrusions that is inserted into the plurality of lamp sockets and at least one of the second balance electrodes is mounted inside each of the plurality of protrusions and faces the electrode formed at an edge thereof.

11. The backlight assembly of claim 1, wherein each of the plurality of lamp sockets further comprises a support member to support the balance board.

12. The backlight assembly of claim 11, wherein the support member faces the socket electrode inside the lamp socket such that when a balance capacitor is inserted between the socket electrode and the support member, the support member applies pressure to the balance capacitor towards the socket electrode.

13. A liquid crystal display comprising:
    a liquid crystal panel; and
    a backlight assembly including a plurality of lamp sockets each having a socket electrode, a plurality of lamps inserted into the plurality of lamp sockets, respectively, and each of the lamps comprising a lamp electrode connected with the socket electrode of the lamp socket in which the lamp is inserted, an inverter outputting a driving voltage for driving the plurality of lamps, and a balance board having a plurality of balance capacitors,
    wherein the plurality of balance capacitors are inserted into the plurality of lamp sockets, respectively, and each of the balance capacitors comprises a first balance electrode provided with the driving voltage and a second balance electrode connected with the socket electrode of the lamp socket in which the balance capacitor is inserted.

14. The liquid crystal display of claim 13, wherein the balance board is provided with the driving voltage to supply a uniform driving current to each of the plurality of lamps and the driving current is provided to the lamp electrode of each of the lamps through each of the plurality of balance capacitors, respectively.

15. The liquid crystal display of claim 13, wherein the balance board comprises:
    a body; and
    an insulating substrate extending from the body and comprising a plurality of protrusions inserted into the plurality of lamp sockets, respectively,
    wherein at least one of the first balance electrodes is formed on a first surface of each of the plurality of protrusions and at least one of the second balance electrodes is formed on a second surface of each of the plurality of protrusions, the second surface facing the first surface.

16. The liquid crystal display of claim 15, wherein the first balance electrodes are interconnected.

17. The liquid crystal display of claim 15, wherein the second balance electrodes are separated and insulated from each other.

18. The liquid crystal display of claim 15, wherein the balance board further comprises an insulating film which covers the first balance electrodes.

19. The liquid crystal display of claim 13, wherein the balance board comprises:
an insulating substrate; and
a plurality of dielectrics formed to protrude from a side of the insulating substrate,
wherein at least one of the first balance electrodes is formed on a first surface of each of the plurality of dielectrics and at least one of the second balance electrodes is formed on a second surface of each of the plurality of dielectrics, the second surface facing the first surface.

20. The liquid crystal display of claim 13, wherein the balance board comprises:
a body; and
an insulating substrate extending from the body and comprising a plurality of protrusions, inserted into the plurality of lamp sockets, respectively,
wherein at least one of the first balance electrodes is formed inside each of the plurality of protrusions and at least one of the second balance electrodes is formed outside each of the plurality of protrusions.

21. The liquid crystal display of claim 20, wherein each of the plurality of balance capacitors is a cylindrical capacitor.

22. The liquid crystal display of claim 13, wherein the balance board comprises:
a body; and
a plurality of protrusions extending from the body, which are inserted into the plurality of lamp sockets, respectively,
wherein at least one of the first balance electrodes is formed at an edge of each of the plurality of protrusions that is inserted into the plurality of lamp sockets and at least one of the second balance electrodes is mounted inside each of the plurality of protrusions and faces the electrode formed at an edge thereof.

23. The liquid crystal display of claim 13, wherein each of the plurality of lamp sockets further comprises a support member to support the balance board.

24. The liquid crystal display of claim 23, wherein the support member faces the socket electrode inside the lamp socket such that when the balance capacitor is inserted between the socket electrode and the support member, the support member applies pressure to the balance capacitor towards the socket electrode.

25. A balance board for a backlight assembly comprising:
a body; and
a plurality of protrusions extending from the body,
wherein a first balance electrode is formed on a first surface of each of the plurality of protrusions and a second balance electrode is formed on a second surface of each of the plurality of protrusions, the first and second surfaces facing each other, and
wherein each protrusion having the first and second balance electrodes formed thereon constitutes a balance capacitor.

* * * * *